(12) United States Patent
Gandhi et al.

(10) Patent No.: US 8,930,063 B2
(45) Date of Patent: Jan. 6, 2015

(54) METHOD FOR DETERMINING OBJECT SENSOR MISALIGNMENT

(75) Inventors: Daniel Gandhi, Auburndale, MA (US); Satish Rayarapu, Canton, MI (US); Dmitriy Feldman, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 213 days.

(21) Appl. No.: 13/402,089

(22) Filed: Feb. 22, 2012

(65) Prior Publication Data

US 2013/0218398 A1   Aug. 22, 2013

(51) Int. Cl.
*G01M 17/00* (2006.01)

(52) U.S. Cl.
USPC ............. 701/31.1; 701/30.5; 701/36; 701/96; 701/301; 342/69; 342/73; 342/81; 342/90; 342/95; 342/174; 73/514.01; 180/128; 180/167; 180/168; 180/169

(58) Field of Classification Search
USPC ................... 701/31.1, 34, 36, 96, 223, 301; 342/69–73, 81, 90, 95, 174; 73/514.01; 180/128, 167–169
See application file for complete search history.

(56) References Cited

U.S. PATENT DOCUMENTS

| | | | |
|---|---|---|---|
| 5,583,495 A * | 12/1996 | Ben Lulu | 340/904 |
| 6,121,916 A * | 9/2000 | McDade | 342/70 |
| 6,542,111 B1 * | 4/2003 | Wilson | 342/70 |
| 6,728,617 B2 * | 4/2004 | Rao et al. | 701/45 |
| 6,801,843 B2 * | 10/2004 | Rao et al. | 701/45 |
| 7,406,199 B2 * | 7/2008 | Lindeman | 382/224 |
| 7,616,101 B2 * | 11/2009 | Kuttenberger et al. | 340/435 |
| 7,681,448 B1 * | 3/2010 | Preston et al. | 73/432.1 |
| 7,777,669 B2 * | 8/2010 | Tokoro et al. | 342/70 |
| 8,001,860 B1 * | 8/2011 | Preston et al. | 73/866.5 |
| 2003/0025597 A1 * | 2/2003 | Schofield | 340/435 |
| 2010/0228419 A1 * | 9/2010 | Lee et al. | 701/25 |

* cited by examiner

*Primary Examiner* — James Trammell
*Assistant Examiner* — Majdi Alsomiri
(74) *Attorney, Agent, or Firm* — Lionel D. Anderson; Reising Ethington P.C.

(57) ABSTRACT

A vehicle system and method that can determine object sensor misalignment while a host vehicle is being driven, and can do so without requiring multiple sensors with overlapping fields-of-view. In an exemplary embodiment where the host vehicle is traveling in generally a straight line, the present method uses an object sensor to track the path of a stationary object as it moves through the sensor's field-of-view and compares the sensed object path to an expected object pat*h. If the sensed and expected paths of the stationary object deviate by more than some amount, then the method determines that the object sensor is skewed or otherwise misaligned.

18 Claims, 2 Drawing Sheets

METHOD FOR DETERMINING OBJECT SENSOR MISALIGNMENT

FIELD

Figure 1:
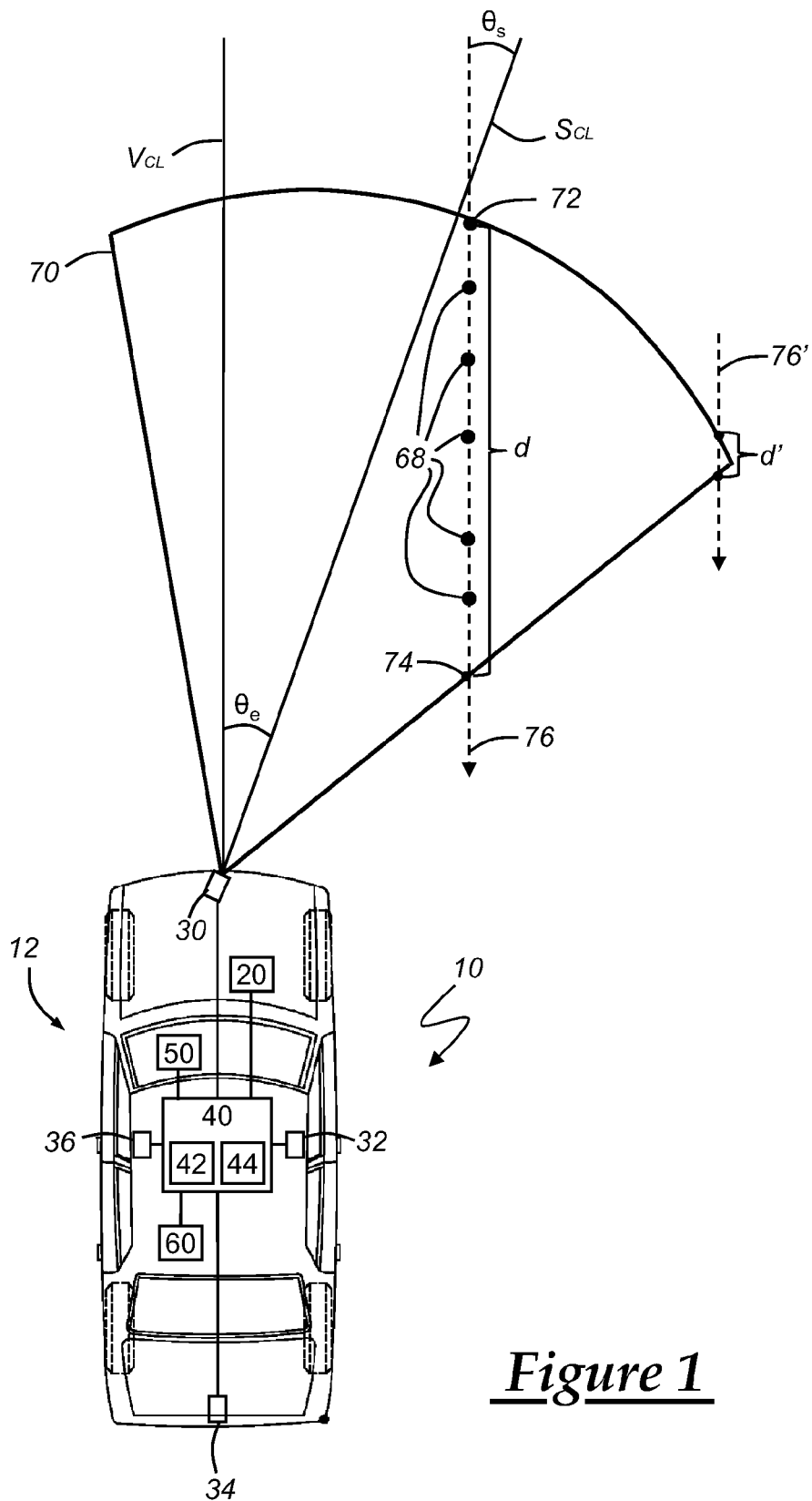

The present invention generally relates to object sensors and, more particularly, to vehicle-mounted object sensors that can detect external objects while the vehicle is driving.

BACKGROUND

Vehicles are increasingly using different types of object sensors, such as those based on RADAR, LIDAR and/or cameras, to gather information regarding the presence and position of external objects surrounding a host vehicle. It is possible, however, for an object sensor to become somewhat misaligned or skewed such that it provides inaccurate sensor readings. For instance, if a host vehicle is involved in a minor collision, this can unknowingly disrupt the internal mounting or orientation of an object sensor and cause it to provide slightly inaccurate sensor readings. This can be an issue if the erroneous sensor readings are then provided to other vehicle modules (e.g., a safety control module, an adaptive cruise control module, an automated lane change module, etc.) and are used in their computations.

SUMMARY

According to one embodiment, there is provided a method for use with an object sensor located on a host vehicle. The method may comprise the steps of: (a) determining if the host vehicle is traveling in a generally straight line; (b) when the host vehicle is traveling in a generally straight line, tracking an object with the object sensor as it moves through the object sensor field-of-view so that a sensed object path is established; and (c) comparing the sensed object path with an expected object path in order to determine if the object sensor is misaligned.

According to another embodiment, there is provided a method for use with an object sensor located on a host vehicle. The method may comprise the steps of: (a) determining if the host vehicle is traveling in a generally straight line; (b) when the host vehicle is traveling in a generally straight line, tracking an object with the object sensor by determining an object entry point where the object enters an object sensor field-of-view and an object exit point where the object exits the object sensor field-of-view; (c) using the object entry point and the object exit point to determine if the object is stationary; (d) when the object is stationary, evaluating a sensed object path that extends from the object entry point to the object exit point by determining a sensed object angle ($\theta_s$) corresponding to the sensed object path and an expected object angle ($\theta_e$) corresponding to an expected object path; and (e) using the sensed object angle ($\theta_s$) and the expected object angle ($\theta_e$) to determine if the object sensor is misaligned.

According to another embodiment, there is provided a vehicle system on a host vehicle. The vehicle system may comprise: one or more vehicle sensors providing sensor readings, the vehicle sensor readings indicate whether or not the host vehicle is traveling in a generally straight line; one or more object sensors providing sensor readings, the object sensor readings establish a sensed object path for an object as it moves through an object sensor field-of-view; and a control module being coupled to the one or more vehicle sensors for receiving the vehicle sensor readings and being coupled to the one or more object sensors for receiving the object sensor readings. The control module is configured to compare the sensed object path with an expected object path in order to determine if the object sensor is misaligned when the host vehicle is traveling in a generally straight line.

DRAWINGS

Figure 2:
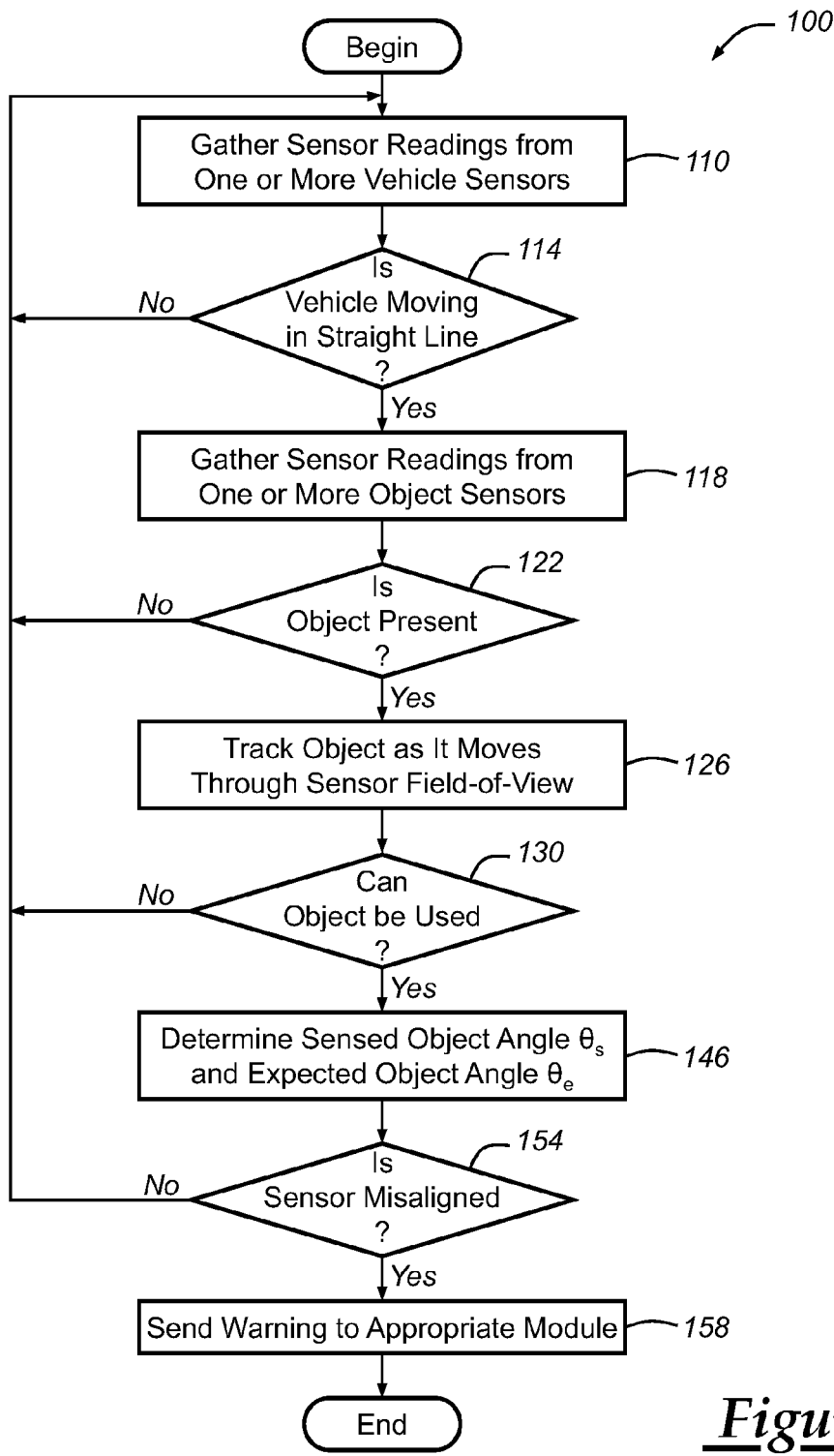

Preferred exemplary embodiments will hereinafter be described in conjunction with the appended drawings, wherein like designations denote like elements, and wherein:

FIG. 1 is a schematic view of a host vehicle having an exemplary vehicle system; and FIG. 2 is a flowchart illustrating an exemplary method for determining object sensor misalignment and may be used with a vehicle system, such as the one shown in FIG. 1.

DESCRIPTION

The exemplary vehicle system and method described herein may determine object sensor misalignment while a host vehicle is being driven, and may do so without requiring multiple sensors with overlapping fields-of-view. If a misalignment is detected, the vehicle system and method can send a corresponding notification to the user, the vehicle, or to some other source indicating that there is a sensor misalignment that should be fixed. This may be particularly advantageous in circumstances where other vehicle modules—for instance, a safety control module, an adaptive cruise control module, an automated lane change module, etc.—depend on and utilize the output of the misaligned object sensor. In an exemplary embodiment where the host vehicle is traveling in a straight line, the present method uses an object sensor to track the path of a stationary object as it moves through the sensor's field-of-view and compares the sensed object path to an expected object path. If the sensed and expected paths of the stationary object deviate by more than some amount, then the method determines that the object sensor is skewed or otherwise misaligned.

With reference to FIG. 1, there is shown a general and schematic view of an exemplary host vehicle 10 with a vehicle system 12 installed or mounted thereon, where the vehicle system includes one or more object sensors that may become skewed or misaligned with respect to their intended orientation. It should be appreciated that the present system and method may be used with any type of vehicle, including traditional passenger vehicles, sports utility vehicles (SUVs), cross-over vehicles, trucks, vans, buses, recreational vehicles (RVs), etc. These are merely some of the possible applications, as the system and method described herein are not limited to the exemplary embodiments shown in the figures and could be implemented in any number of different ways. According to one example, vehicle system 12 includes vehicle sensors 20 (e.g., inertial measurement unit (IMU), steering angle sensor (SAS), wheel speed sensors, etc.), object sensors 30-36, and control module 40, and the vehicle system may provide a user with a notification or other sensor status information via user interface 50 or some other component, device, module and/or system 60.

Any number of different sensors, components, devices, modules, systems, etc. may provide vehicle system 12 with information or input that can be used by the present method. These include, for example, the exemplary sensors shown in FIG. 1, as well as other sensors that are known in the art but are not shown here. It should be appreciated that vehicle sensors 20, object sensors 30-36, as well as any other sensor located in and/or used by vehicle system 12 may be embodied in hardware, software, firmware or some combination thereof. These sensors may directly sense or measure the conditions for which they are provided, or they may indirectly evaluate such conditions based on information provided by other sensors, components, devices, modules, systems, etc. Furthermore, these sensors may be directly coupled to control module 40, indirectly coupled via other electronic devices, a vehicle communications bus, network, etc., or coupled according to some other arrangement known in the art. These sensors may be integrated within or be a part of another vehicle component, device, module, system, etc. (e.g., vehicle or object sensors that are already a part of an engine control module (ECM), traction control system (TCS), electronic stability control (ESC) system, antilock brake system (ABS), etc.), they may be stand-alone components (as schematically shown in FIG. 1), or they may be provided according to some other arrangement. It is possible for any of the various sensor readings described below to be provided by some other component, device, module, system, etc. in host vehicle 10 instead of being provided by an actual sensor element. In some instances, multiple sensors might be employed to sense a single parameter (e.g., for providing redundancy), although this is not necessary. It should be appreciated that the foregoing scenarios represent only some of the possibilities, as vehicle system 12 is not limited to any particular sensor or sensor arrangement.

Vehicle sensors 20 provide vehicle system 12 with various readings, measurements, or other information that may be useful to method 100. For example, vehicle sensors 20 may measure: wheel speed, wheel acceleration, vehicle speed, vehicle acceleration, vehicle dynamics, yaw rate, steering angle, longitudinal acceleration, lateral acceleration, or any other vehicle operating parameter that may be useful to method 100. Vehicle sensors 20 may utilize a variety of different sensor types and techniques, including those that use rotational wheel speed, ground speed, accelerator pedal position, gear shifter selection, accelerometers, engine speed, engine output, and throttle valve position, to name a few. Skilled artisans will appreciate that these sensors may operate according to optical, electromagnetic or other technologies, and that other parameters may be derived or calculated from these readings (e.g., acceleration may be calculated from velocity). According to an exemplary embodiment, vehicle sensors 20 include a steering angle sensor and a vehicle speed sensor.

Object sensors 30-36 provide vehicle system 12 with sensor readings or other information that relates to one or more objects around host vehicle 10 and can be used by the present method. In one example, object sensors 30-36 generate sensor readings or output that is representative of the presence, position, velocity and/or acceleration of objects around host vehicle 10. These readings may be absolute in nature (e.g., an object position reading) or they may be relative in nature (e.g., a relative distance reading, which relates to the range or distance between host vehicle 10 and some object). Each of the object sensors 30-36 may be a single sensor or a combination of sensors, and may include a light detection and ranging (LIDAR) device, a radio detection and ranging (RADAR) device, a laser device, a vision device (e.g., camera, etc.), or any other sensing device capable of providing the two-dimensional position of an external object. According to an exemplary embodiment, object sensor 30 includes a forward-looking, long-range RADAR or LIDAR device that is mounted on the front of the vehicle, such as at the front bumper or behind the vehicle grille, and monitors an area in front of the vehicle that includes the current lane plus one or more lanes on each side of the current lane. Similar types of sensors may be used for rearward-looking object sensor 34 mounted on the rear of the vehicle, such as at the rear bumper or in the rear window, and for lateral or sideward-looking object sensors 32 and 36 mounted on each side of the vehicle (e.g., driver and passenger sides); these sensors may have a smaller or shorter range than their forward-looking counterpart. A camera or other vision device could be used in conjunction with such sensors, as other embodiments are also possible.

Control module 40 may include any variety of electronic processing devices, memory devices, input/output (I/O) devices, and/or other known components, and may perform various control and/or communication related functions. In an exemplary embodiment, control module 40 includes an electronic memory device 42 that stores various sensor readings (e.g., sensor readings from sensors 20 and 30-36), look up tables or other data structures, algorithms (e.g., the algorithm embodied in the exemplary method described below), etc. Memory device 42 may also store pertinent characteristics and background information pertaining to host vehicle 10, such as information relating to expected sensor mounting or orientation, sensor range, sensor field-of-view, etc. Control module 40 may also include an electronic processing device 44 (e.g., a microprocessor, a microcontroller, an application specific integrated circuit (ASIC), etc.) that executes instructions for software, firmware, programs, algorithms, scripts, etc. that are stored in memory device 42 and may govern the processes and methods described herein. Control module 40 may be electronically connected to other vehicle devices, modules and systems via suitable vehicle communications and can interact with them when required. These are, of course, only some of the possible arrangements, functions and capabilities of control module 40, as other embodiments could also be used.

Depending on the particular embodiment, control module 40 may be a stand-alone vehicle module (e.g., an object detection controller, a safety controller, etc.), it may be incorporated or included within another vehicle module (e.g., a safety control module, an adaptive cruise control module, an automated lane change module, a park assist module, a brake control module, a steering control module, etc.), or it may be part of a larger network or system (e.g., a traction control system (TCS), electronic stability control (ESC) system, antilock brake system (ABS), driver assistance system, adaptive cruise control system, lane departure warning system, etc.), to name a few possibilities. Control module 40 is not limited to any one particular embodiment or arrangement.

User interface 50 exchanges information or data with occupants of host vehicle 10 and may include any combination of visual, audio and/or other types of components for doing so. Depending on the particular embodiment, user interface 50 may be an input/output device that can both receive information from and provide information to the driver (e.g., a touch-screen display or a voice-recognition human-machine interface (HMI)), an input device only (e.g., a microphone), an output device only (e.g., a speaker, an instrument panel gauge, or a visual indicator on the rear-view mirror), or some other component. User interface 50 may be a stand-alone module; it may be part of a rear-view mirror assembly, it may be part of an infotainment system or part of some other module, device or system in the vehicle; it may be mounted on a dashboard (e.g., with a driver information center (DIC)); it may be projected onto a windshield (e.g., with a heads-up display); or it may be integrated within an existing audio system, to cite a few examples. In the exemplary embodiment shown in FIG. 1, user interface 50 is incorporated within an instrument panel of host vehicle 10 and alerts a driver of a misaligned object sensor by sending a written or graphic notification or the like. In another embodiment, user interface

50 sends an electronic message (e.g., a diagnostic trouble code (DTC), etc.) to some internal or external destination alerting it of the sensor misalignment. Other suitable user interfaces may be used as well.

Module 60 represents any vehicle component, device, module, system, etc. that requires a sensor reading from one or more object sensors 30-36 in order to perform its operation. To illustrate, module 60 could be an active safety system, an adaptive cruise control (ACC) system, an automated lane change (LCX) system, or some other vehicle system that uses sensor readings relating to nearby vehicles or objects in order to operate. In the example of an adaptive cruise control (ACC) system, control module 40 may provide ACC system 60 with a warning to ignore sensor readings from a specific sensor if the present method determines that the sensor is misaligned; inaccuracies in the sensors readings could negatively impact the performance of ACC system 60. Depending on the particular embodiment, module 60 may be an input/output device that can both receive information from and provide information to control module 40, and it can be a stand-alone vehicle electronic module or it can be part of a larger network or system (e.g., a traction control system (TCS), electronic stability control (ESC) system, antilock brake system (ABS), driver assistance system, adaptive cruise control (ACC) system, lane departure warning system, etc.), to name a few possibilities. It is even possible for module 60 to be combined or integrated with control module 40, as module 60 is not limited to any one particular embodiment or arrangement.

Again, the preceding description of exemplary vehicle system 12 and the drawing in FIG. 1 are only intended to illustrate one potential embodiment, as the following method is not confined to use with only that system. Any number of other system arrangements, combinations and architectures, including those that differ significantly from the one shown in FIG. 1, may be used instead.

Turning now to FIG. 2, there is shown an exemplary method 100 that may be used with vehicle system 12 in order to determine if one or more object sensors 30-36 are misaligned, skewed or otherwise oriented improperly. As mentioned above, an object sensor may become misaligned as a result of a collision, a significant pothole or other disruption in the road surface, or just through the normal wear and tear of years of vehicle operation, to name a few possibilities. Method 100 may be initiated or started in response to any number of different events and can be executed on a periodic, aperiodic and/or other basis, as the method is not limited to any particular initialization sequence. According to some non-limiting examples, method 100 can be continuously running in the background, it can be initiated following an ignition event, or it may be started following a collision, to cite several possibilities.

Beginning with step 110, the method gathers sensor readings from one or more vehicle sensors 20. The gathered readings may include: wheel speed, wheel acceleration, vehicle speed, vehicle acceleration, vehicle dynamics, yaw rate, steering angle, longitudinal acceleration, lateral acceleration, or any other suitable vehicle operating parameter. In one example, step 110 obtains steering angle readings, yaw rate readings and/or other readings that indicate whether or not host vehicle 10 is traveling in a generally straight line, as well as vehicle speed readings that indicate how fast the host vehicle is moving. Skilled artisans will appreciate that step 110 may gather or otherwise obtain other sensor readings as well, as the aforementioned readings are only representative of some of the possibilities.

Step 114 then determines if host vehicle 10 is moving or traveling in a generally straight line. When the host vehicle is traveling in a straight line—for example, across some stretch of highway or other road—certain assumptions can be made that simplify the calculations performed by method 100 and thereby make the corresponding algorithm lighter weight and less resource intensive, as will be subsequently explained in greater detail. In an exemplary embodiment, step 114 evaluates the sensor readings from the previous step (e.g., steering angle readings, yaw rate readings, wheel speed readings, etc.) and uses this information to determine if host vehicle 10 is by-and-large moving in a straight line. This step may require the steering angle or yaw rate to be less than some predetermined threshold for a certain amount of time or distance, or it may require the various wheel speed readings to be within some predetermined range of one another, or it may use other techniques for evaluating the linearity of the host vehicle's path. It is even possible for step 114 to use information from some type of GPS-based vehicle navigation system in order to determine if the host vehicle is traveling in a generally straight line. The term "generally straight," as well as its different variants, is meant to include those vehicle paths that are straight or linear enough for the algorithmic assumptions described later on to apply; it does not mean that the host vehicle must be moving in a perfectly straight line or direction. The linear status of the vehicle's path could be provided by some other device, module, system, etc. located in the host vehicle, as this information may already be available. If host vehicle 10 is moving in a generally straight line, then the method proceeds to step 118; otherwise, the method loops back to the beginning.

Step 118 gathers sensor readings from one or more object sensors 30-36 located around the host vehicle. The sensor readings indicate whether or not an object has entered the field-of-view of a certain object sensor, as will be explained, and may be provided in a variety of different forms. In one embodiment, step 118 monitors a field-of-view 70 of object sensor 30, which is mounted towards the front of host vehicle 10. Field-of-view 70 is somewhat pie-shaped and is located out in front of the host vehicle, but the field-of-view may vary depending on the range of the sensor (e.g., long range, short range, etc.), the type of sensor (e.g., radar, LIDAR, LADAR, laser, etc.), the location and mounting orientation of the sensor (e.g., a front sensor 30, side sensors 32 and 36, rear sensor 34, etc.) or some other characteristic. Step 118 may be combined with step 114 or some other suitable step within the method, as it does not have to be performed separately.

Step 122 determines if an object is present in the field-of-view of one or more of the object sensors. According to one example, step 122 monitors the field-of-view 70 for forward-looking object sensor 30, and uses any number of suitable techniques to determine if one or more objects have entered the field-of-view. The techniques employed by this step may vary for different environments (e.g., high object density environments like urban areas, low object density environments like rural areas, etc.). It is possible for step 122 to consider and evaluate multiple objects within field-of-view 70 at the same time, both moving and stationary objects, as well as other object scenarios. This step may utilize a variety of suitable filtering and/or other signal processing techniques to evaluate the sensor readings and to determine whether or not an object really exists. Some non-limiting examples of such techniques include the use of predetermined signal-to-noise ratio (SNR) thresholds in the presence of background noise, as well as other known methods. If step 122 determines that an object is present, then the method proceeds to step 126; otherwise, the method loops back to the beginning for further monitoring.

Next, step 126 tracks the object as it moves through the field-of-view of one or more of the object sensors. By tracking or monitoring the object as it passes through a sensor field-of-view, this step is able to develop or establish a sensed object path that may be useful in subsequent steps. The sensed object path may, for example, indicate whether the object is a stationary object or a moving one. According to an exemplary embodiment, step 126 records information related to an object entry point 72 and an object exit point 74 for each object that enters field-of-view 70. Some examples of the types of information or data that could be stored for each object entry and/or exit point include a time associated with each point, a position associated with each point (e.g., Cartesian, polar or other coordinates, distance to host vehicle, etc.), or some other pertinent data. For instance, step 126 may determine the time and position of an object as it enters field-of-view 70 and store that data in conjunction with object entry point 72, and determine the time and position of the object as it exits or leaves the field-of-view and store that data in connection with object exit point 74. It is also possible for step 126 to track or monitor the object while it is within the object sensor field-of-view—not just at the boundaries of the field-of-view—and evaluate and/or store the resulting data. In an exemplary embodiment, the object is tracked through field-of-view 70 by continuously generating and updating temporary data points 68 until the object is no longer detected (i.e., object exit point 74), at which time only the first and last data points are stored in memory device 42; storing only the first and last data points can reduce the amount of stored data and can free up memory and/or computational resources. Information relating to the temporary or intermediate data points 68 may be stored and utilized as well, depending on the particular application. Step 126 may employ techniques for filtering or verifying the data, such as averaging or smoothing two or more data points, etc. Other embodiments are also possible.

Step 130 then determines if the sensed object can be used to evaluate the alignment or orientation of the object sensor. Two criteria that may be considered by step 130 include: the length of the object path and whether or not the object is stationary. If the object were to just barely clip or pass through field-of-view 70, for example, it may produce an object path 76' with a short length (d') that is not long enough for accurate use with method 100 (the algorithmic assumptions or short-cuts described below are typically more accurate with sufficiently long object paths). One way for step 130 to determine if the sensed object is a good candidate for use with the present method is to calculate the length (d) between object entry point 72 and object exit point 74 (i.e., the object path length) and then to compare this length to some path length threshold. The path length threshold or minimum path length depends on a number of factors, including the type, quality and/or location of the object sensor being evaluated. For example, if object sensor 30 is a lower quality, long range sensor, then a longer path length threshold may be needed; if it is a higher quality or short range sensor, then a shorter path length threshold may suffice. It is also possible for step 130 to determine the sufficiency or usability of the sensed object by considering where the object path passes through the field-of-view (the closer to sensor centerline $S_{CL}$, the more useful it may be). As mentioned above, the object path length is only one of the potential criteria that may be considered by step 130 in order to determine the sufficiency of the sensed object; whether or not the object is stationary is another.

In the present method, stationary objects are usually preferable over moving objects for purposes of evaluating the alignment or orientation of an object sensor. Thus, step 130 may check to see if the sensed object is stationary or is moving, and may do so in a number of different ways. According to an exemplary embodiment, step 130 determines the apparent or average velocity of the sensed object while it is in field-of-view 70 and then compares that to the velocity of host vehicle 10; if the difference between the two velocities is less than some amount, then the object is considered stationary. In one example, step 130 calculates the apparent or average velocity of the sensed object by dividing the distance between object entry and exit points by the time between such points:

Object Velocity=(Object Exit Point position−Object Entry Point position)/(Object Exit Point time−Object Entry Point time)

The preceding calculation may be performed in Cartesian coordinates, polar coordinates, or some other suitable coordinate system, and the accuracy of the calculation is due, at least in part, to assumptions attributable to the generally straight or linear path of the vehicle. If host vehicle 10 was being driven on a bend or curve, then the assumptions associated with this calculation may not apply. By performing the calculation above, host vehicle 10 may avoid having to use expensive and sophisticated object sensors that internally calculate object velocity, as such sensors can add unwanted cost to the vehicle. Step 130 may gather the vehicle velocity by querying control module 40 or some other source so that it may compare the object and vehicle velocities together. If the difference between the vehicle and object velocities is less than some velocity threshold (e.g., a fixed threshold, a variable threshold that is a fraction or percentage of the vehicle velocity, or some other type of threshold), then it is likely that the sensed object is stationary; otherwise, the method assumes that the object is a moving target, such as another vehicle. In one example, step 130 compares the difference of the vehicle and object velocities to a fixed threshold, such as 5 m.p.h., that is selected to take normal sensor noise into account.

In the preceding example where two criteria were used, step 130 checks to see if the object path length is long enough and if the object is stationary. If both of these criteria are met, the exemplary method concludes that the sensed object is a good candidate for use with the sensor alignment techniques described below and it proceeds to step 146. If both criteria are not met, then the method returns to step 110 and continues to look for an appropriate object that can be used to evaluate the alignment of the object sensor. It should be appreciated that other criteria and combinations of criteria may be used for the evaluation in step 130, as the present method is not limited to the exemplary criteria described above.

At this point, the method has determined that the vehicle is moving in a generally straight line (step 114), it has detected the presence of an object in the object sensor field-of-view (step 122), it has determined that the object is appropriate for use in evaluating sensor alignment (step 130), and now the method can evaluate the alignment or orientation of the object sensor in question.

Step 146 evaluates sensor alignment by determining a sensed object angle ($\theta_s$) and an expected object angle ($\theta_e$), and then comparing these two angles to one another. The sensed object angle ($\theta_s$) generally refers to the sensed or measured angle of the object path 76 and, according to the embodiment shown in FIG. 1, the sensed object angle ($\theta_s$) represents the angle between object path 76 (i.e., line drawn between object entry and exit points 72, 74) and the sensor centerline $S_{CL}$. The expected object angle ($\theta_e$) generally refers to the expected or predetermined mounting angle of the object sensor in question and, according to FIG. 1, the expected object angle ($\theta_e$) represents the angle between the vehicle centerline $V_{CL}$ and the sensor centerline $S_{CL}$. The expected object angle ($\theta_e$) may be the known mounting orientation of the object sensor in question, and is usually established when the vehicle is being designed, tested or at some other developmental stage, and can be stored in memory device 42 or elsewhere. It should be appreciated that the expected object angle ($\theta_e$) can differ from the approximately 20° orientation illustrated in the drawing. For instance, object sensor 30 can purposely be mounted according to other orientations—say $\theta_e$=5°, 10°, 30°, 45°, etc. The exact orientation or mounting of the object sensor in question can vary depending on the type, quality and intended purpose of the object sensor, as well as the particular application in which it is being used. Furthermore, the actual angles, coordinate frames, etc. that are used to represent ($\theta_s$) and ($\theta_e$) may differ from the examples shown here.

Step 154 then determines if the object sensor is misaligned or is otherwise skewed. In one embodiment, this step compares the expected object angle ($\theta_e$) stored in memory 42 to the sensed object angle ($\theta_s$) that was recently determined in order to calculate the difference between the two angles. The signs of these angles should be taken into account; for example, sensed object angles ($\theta_s$) to the right of the sensor centerline $S_{CL}$ may have one sign and sensed object angles ($\theta_s$) to the left of the sensor centerline $S_{CL}$ (like that shown in FIG. 1) may have a different sign. If the difference between these two angles exceeds some object angle threshold, then it is determined that the object sensor is misaligned. As before, the object angle threshold may be a fixed threshold (e.g., 0°, 1°, 2°, 5°, etc.), a variable threshold (e.g., a percentage or fraction of the sensed or expected object angle), or a threshold that depends on the sensor used, the noise level of the sensor, the vehicle speed, etc., or some other suitable factor. If step 154 determines that the difference between the expected and sensed object angles $\theta_e$ and $\theta_s$ is greater than the object angle threshold, then the object sensor in question is considered misaligned or otherwise skewed. If the angular difference is less than the object angle threshold, then the object sensor is deemed properly aligned. It is worth noting that step 154 may not only detect a sensor misalignment, but it may also identify the sensor that is misaligned or skewed without information from any other object sensor. Appropriate tolerances should be built into the object angle threshold to account for typical manufacturing and mounting errors. Also, skilled artisans will appreciate that appropriate usage of the signs of the angles (i.e., positive or negative) will help determine misalignment even if the sensor is at an equal but opposite angle (e.g., will detect a misalignment when $\theta_s=-\theta_e$).

Those skilled in the art will appreciate that the present method may employ one or more redundancy checks or other techniques to ensure that a finding of object sensor misalignment is correct. For instance, the method may employ some type of programming loop that requires the method to find that the sensor is misaligned for a certain number of consecutive iterations (e.g., five iterations) or a certain ratio of iterations (e.g., four out of five iterations) before concluding that the sensor is, in fact, misaligned. In another example, the present method may require that multiple stationary objects be identified and used before concluding that an object sensor is misaligned. In such a case, step 154 would have to reach a finding of sensor misalignment using multiple and different stationary objects. In yet another example, method 100 may be used in conjunction with object sensors having overlapping fields-of-view or some other type of hardware redundancy in order to ensure the accuracy of the findings. Other types of redundancies and techniques are certainly possible as well.

If the previous step determines that the object sensor in question is misaligned, then step 158 may take one or more remedial actions. Some examples of suitable remedial actions include: sending a warning message to the driver via user interface 50, to some other part of the host vehicle like module 60, or to a remotely located back-end facility (not shown); setting a sensor fault flag or establishing a diagnostic trouble code (DTC); or disabling some other device, module, system and/or feature in the host vehicle that depends on the sensor readings from the misaligned object sensor for proper operation, to cite a few possibilities. In one embodiment, step 158 sends a warning message to user interface 50 informing the driver that object sensor 30 is misaligned and sends command signals to module 60 instructing the module to avoid using sensor readings from the misaligned or skewed object sensor until it can be fixed. Other types and combinations of remedial actions are certainly possible.

The exemplary method described herein may be embodied in a lightweight algorithm that is less memory- and processor-intensive than previous methods that gather and analyze large collections of data points. For example, use of a sensed object path, instead of all of the intervening data points between the object entry and exit points, can reduce the memory- and processor-related burdens on the system. These algorithmic efficiencies enable method 100 to be executed or run while host vehicle 10 is being driven, as opposed to placing the sensor in an alignment mode and driving with a predefined route or requiring that the host vehicle be brought to a service station and examined with specialized diagnostic tools. Furthermore, it is not necessary for host vehicle 10 to utilize high-cost object sensors that internally calculate and provide the velocity of detected objects or to require multiple object sensors with overlapping fields-of-view, as some systems require.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for use with an object sensor located on a host vehicle, comprising the steps of:
    (a) determining if a sensed object is stationary;
    (b) tracking the object with the object sensor as it moves through the object sensor field-of-view so that a sensed object path is established; and (c) comparing the sensed object path with an expected object path retrieved from a memory device in order to determine if the object sensor is misaligned, wherein the sensed object path is based on readings from the object sensor and the expected object path is based on a known mounting angle of the object sensor.

2. The method of claim 1, wherein step (a) further comprises receiving sensor readings from at least one of a steering angle sensor, a yaw rate sensor, or a wheel speed sensor, and using the sensor readings from at least one of the steering angle sensor, the yaw rate sensor, or the wheel speed sensor and determining if the host vehicle is traveling in a generally straight line.

3. The method of claim 1, wherein step (b) further comprises tracking the object with the object sensor as it moves through the object sensor field-of-view by storing information related to an object entry point and an object exit point.

4. The method of claim 3, wherein the information related to the object entry point includes a time and a position of the object as it enters the object sensor field-of-view and the information related to the object exit point includes a time and a position of the object as it exits the object sensor field-of-view.

5. The method of claim 1, wherein step (b) further comprises tracking the object with the object sensor as it moves through the object sensor field-of-view, and then determining if the object is appropriate for use in evaluating the alignment of the object sensor.

6. The method of claim 5, wherein step (b) further comprises determining if the object is appropriate for use in evaluating the alignment of the object sensor by calculating an object path length for the sensed object path and comparing the object path length to a path length threshold.

7. The method of claim 1, wherein step (a) further comprises determining if the object is stationary by determining an object velocity, determining a host vehicle velocity, and comparing the object velocity to the host vehicle velocity.

8. The method of claim 7, wherein step (a) further comprises determining the object velocity by dividing an object path length by an object path duration.

9. The method of claim 1, wherein step (c) further comprises comparing the sensed object path with the expected object path by determining a sensed object angle (θs) that corresponds to the sensed object path and an expected object angle (θe) that corresponds to the expected object path, and then comparing these two angles to one another.

10. The method of claim 9, wherein step (c) further comprises determining the difference between the sensed object angle (θs) and the expected object angle (θe), and comparing the difference to an object angle threshold.

11. The method of claim 1, further comprising the step of:
(d) taking one or more remedial actions when it is determined that the object sensor is misaligned.

12. The method of claim 11, wherein step (d) further comprises sending a warning message to a user interface that informs the driver that the object sensor is misaligned.

13. The method of claim 11, wherein step (d) further comprises sending command signals to a module on the host vehicle that instruct the module to avoid using sensor readings from the misaligned sensor.

14. The method of claim 1, wherein the method determines if the object sensor is misaligned while the host vehicle is being driven in normal operation.

15. The method of claim 1, wherein the method determines if the object sensor is misaligned without the requirement of multiple object sensors with overlapping fields-of-view.

16. The method of claim 1, wherein the method determines if the object sensor is misaligned without the requirement that the object sensor be able to internally calculate and provide the velocity of a sensed object.

17. A method for use with an object sensor located on a host vehicle, comprising the steps of:
(a) determining if the host vehicle is traveling in a generally straight line;
(b) when the host vehicle is traveling in a generally straight line, tracking an object with the object sensor by determining an object entry point where the object enters an object sensor field-of-view and an object exit point where the object exits the object sensor field-of-view;
(c) using the object entry point and the object exit point to determine if the object is stationary;
(d) when the object is stationary, evaluating a sensed object path that extends from the object entry point to the object exit point by determining a sensed object angle (θs) corresponding to the sensed object path and an expected object angle (θe) corresponding to an expected object path; and
(e) using the sensed object angle (θs) and the expected object angle (θe) to determine if the object sensor is misaligned.

18. A vehicle system on a host vehicle, comprising:
one or more vehicle sensors providing sensor readings, the vehicle sensor readings indicate whether or not the host vehicle is traveling in a generally straight line;
one or more object sensors providing sensor readings, the object sensor readings establish a sensed object path for an object as it moves through an object sensor field-of-view; and
a control module having a memory device, the control module being coupled to the one or more vehicle sensors for receiving the vehicle sensor readings and being coupled to the one or more object sensors for receiving the object sensor readings, wherein the control module is configured to compare the sensed object path with an expected object path based on a known mounting angle of the object sensor stored in the memory device in order to determine if the object sensor is misaligned when the host vehicle is traveling in a generally straight line and the object is stationary.

* * * * *